United States Patent [19]

Miyamoto

[11] Patent Number: 5,535,630
[45] Date of Patent: Jul. 16, 1996

[54] SHOCK LOAD SENSOR

[75] Inventor: Michikazu Miyamoto, Ibaraki-ken, Japan

[73] Assignee: SMC Kabushiki Kaisha, Tokyo, Japan

[21] Appl. No.: 406,051

[22] Filed: Mar. 17, 1995

[30] Foreign Application Priority Data

Mar. 25, 1994 [JP] Japan ................................. 6-056248

[51] Int. Cl.⁶ ............................................... G01L 5/00
[52] U.S. Cl. ............................ 73/778; 73/779; 73/11.04
[58] Field of Search ........................... 73/11.01, 11.04, 73/11.07, 430, 431, 778, 774, 779

[56] References Cited

U.S. PATENT DOCUMENTS

| | | | |
|---|---|---|---|
| 3,470,731 | 10/1969 | Zurawski | 73/11.01 |
| 5,212,357 | 5/1993 | Reneu | 200/61.45 |
| 5,282,387 | 2/1994 | Suzuki | 73/517 R |
| 5,326,945 | 7/1994 | Gotoh et al. | 200/61.45 |
| 5,339,071 | 8/1994 | Eckhaus | 200/61.45 |

*Primary Examiner*—Richard Chilcot
*Assistant Examiner*—Max Noori
*Attorney, Agent, or Firm*—Oblon, Spivak, McClelland, Maier & Neustadt

[57] ABSTRACT

A shock load sensor has a movable member disposed in a casing and supported by a spring or resilient member, and displacement of the movable member responsive to an undue shock load applied thereto is converted into an electrical connection or disconnection. Such an electrical connection or disconnection is indicative of the application of a shock load in excess of the resiliency of the spring or resilient member to the movable member. The shock load sensor is of a simple structure, and may be used to reliably detect a reduction in the shock absorbing capability of a shock absorber, for example.

18 Claims, 4 Drawing Sheets

SHOCK LOAD SENSOR

BACKGROUND OF THE INVENTION

1. Field of the Invention

The present invention relates to a shock load sensor for detecting whether the shock absorbing capability of a shock absorber is normally functioning or not.

2. Description of the Related Art

Shock absorbers are employed to absorb the energy of shocks produced when one member impinges upon another member in machines, apparatus, or the like. Specifically, a shock absorber relies on the resilient force of a spring, the pneumatic pressure of a gas, or the like to absorb the energy of an impact at the time a displaceable member of a machine, an apparatus, or the like hits another member. Through the absorption of the impact energy, the shock absorber prevents the shock from being transmitted to other components for thereby protecting the machine, the apparatus, or the like from damage.

Machines, apparatus, or the like that are manufactured have parts or components whose mechanical strength and specifications are determined on the assumption that shock absorbers thereof function normally. If the shock absorbing capability of the shock absorber is lowered, then the shock absorber is unable to sufficiently absorb the energy of a shock produced upon impact on an object. When this happens, the machine, apparatus, or the like tends to be broken or fails to operate as the applied shock exceeds the predetermined mechanical strength and specifications of the components of machine, apparatus, or the like.

One solution may be to install an acceleration sensor on the displaceable member of the machine, the apparatus, or the like for detecting a reduction in the shock absorbing capability of the shock absorber. However, the acceleration sensor will not be practical because it is highly expensive, increasing the cost of manufacture of the machine, the apparatus, or the like combined therewith.

SUMMARY OF THE INVENTION

It is an object of the present invention to provide a shock load sensor which is of a simple mechanism, can be manufactured inexpensively, and is capable of reliably detecting a reduction in the shock absorbing capability of a shock absorber.

Another object of the present invention is to provide a sensor for detecting whether the shock absorbing capability of a shock absorber mounted in a machine, an apparatus, or the like is normally functioning or not.

Still another object of the present invention is to provide a sensor for preventing a machine, an apparatus, or the like associated with a shock absorber from being broken or failing to operate for thereby protecting the machine, the apparatus, or the like against damage, by detecting whether the shock absorbing capability of the shock absorber is normally functioning or not.

According to the present invention, there is provided a shock load sensor comprising a casing having an attachment surface adapted to be mounted on an apparatus, a pair of terminals mounted on the casing, and a movable member having a predetermined weight, which is made of an electrically conductive material and disposed in the casing for displacement in response to a shock load applied in excess of a predetermined level to bring the terminals into or out of electric connection to each other for thereby producing a signal.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
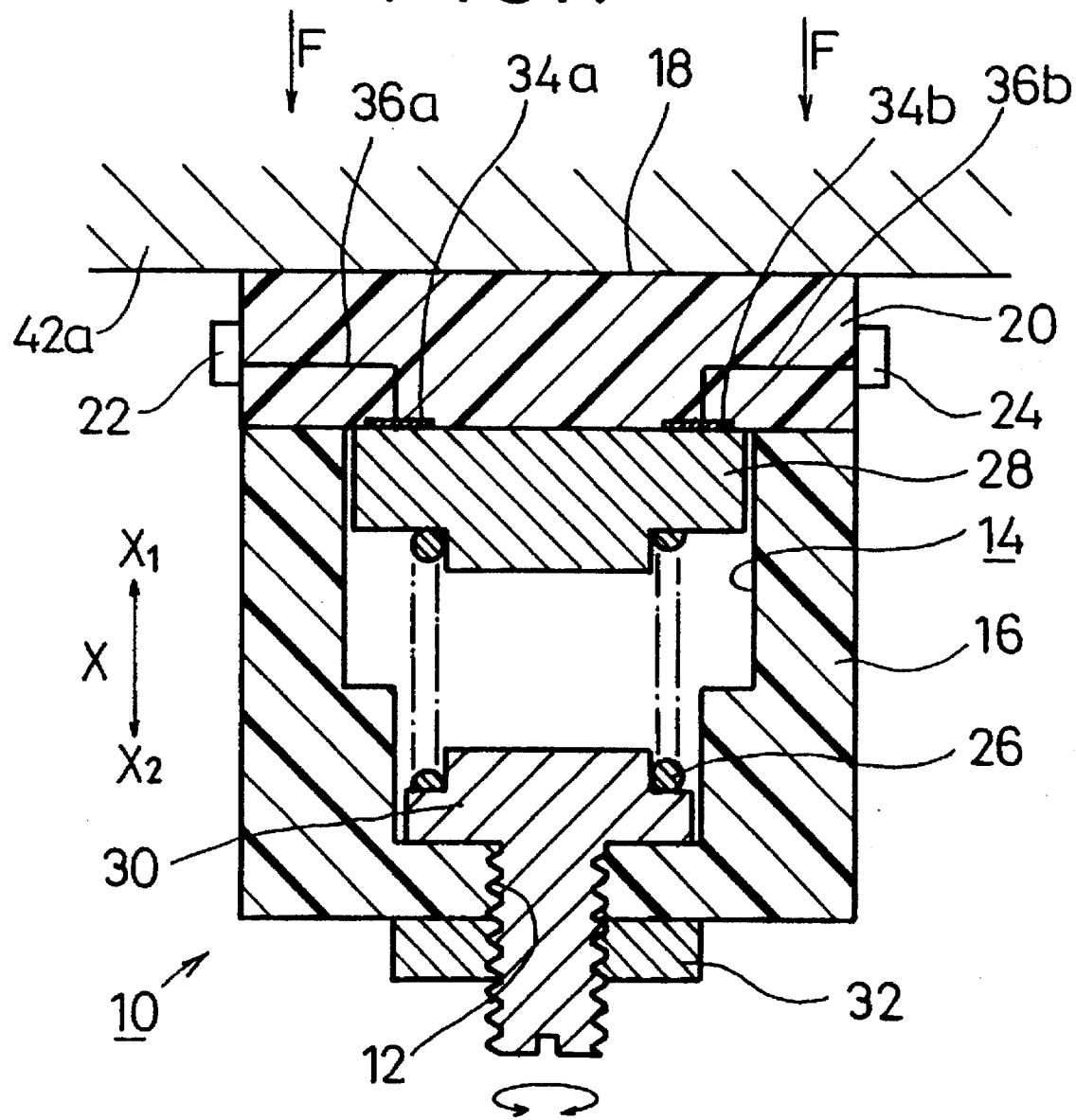
FIG. 1 is a vertical cross-sectional view of a shock load sensor according to a first embodiment of the present invention.

As shown in FIG. 1, a shock load sensor 10 according to a first embodiment of the present invention includes a sensor body 16 having a threaded hole 12 defined in a side panel thereof and a cavity 14 defined therein opposite to the threaded hole 12, an attachment 20 fixed to the sensor body 16 and closing the cavity 14, the attachment 20 having an attachment surface 18 facing away from the sensor body 16 for attachment to an apparatus, and a pair of terminals 22, 24 disposed on respective opposite outer sides of the attachment 20 and spaced from each other in electrically isolated relation to each other. The sensor body 16 and the attachment 20 are made of an electrically insulating material such as synthetic resin or the like, and jointly serve as a casing.

The shock load sensor 10 also includes a spring 26 housed in the cavity 14, a movable member 28 having a predetermined weight, which is disposed in the cavity 14 and normally urged by the spring 26 to move in a direction indicated by the arrow $X_1$ along an X-axis for electrically connecting the terminals 22, 24 to each other, an adjustment screw 30 threaded through the threaded hole 12 and having a head disposed as a spring seat in the cavity 14 and held in engagement with the spring 26 for adjusting the resilient force of the spring 26 upon rotation of the adjustment screw 30, and a lock nut 32 threaded over the adjustment screw 30 outside of the sensor body 16 for holding the adjustment screw 30 in a rotated position thereof. The movable member 28 is made of an electrically conductive material such as metal.

The attachment 20 has a pair of spaced metal strips 34a, 34b on its surface, opposite to the attachment surface 18 thereof, normally held in contact with the movable member 28. The metal strips 34a, 34b are electrically connected to the respective terminals 22, 24 through respective lead wires 36a, 36b.

Operation of the shock load sensor 10 shown in FIG. 1 will be described below with reference to FIGS. 1 and 4.

Figure 4:
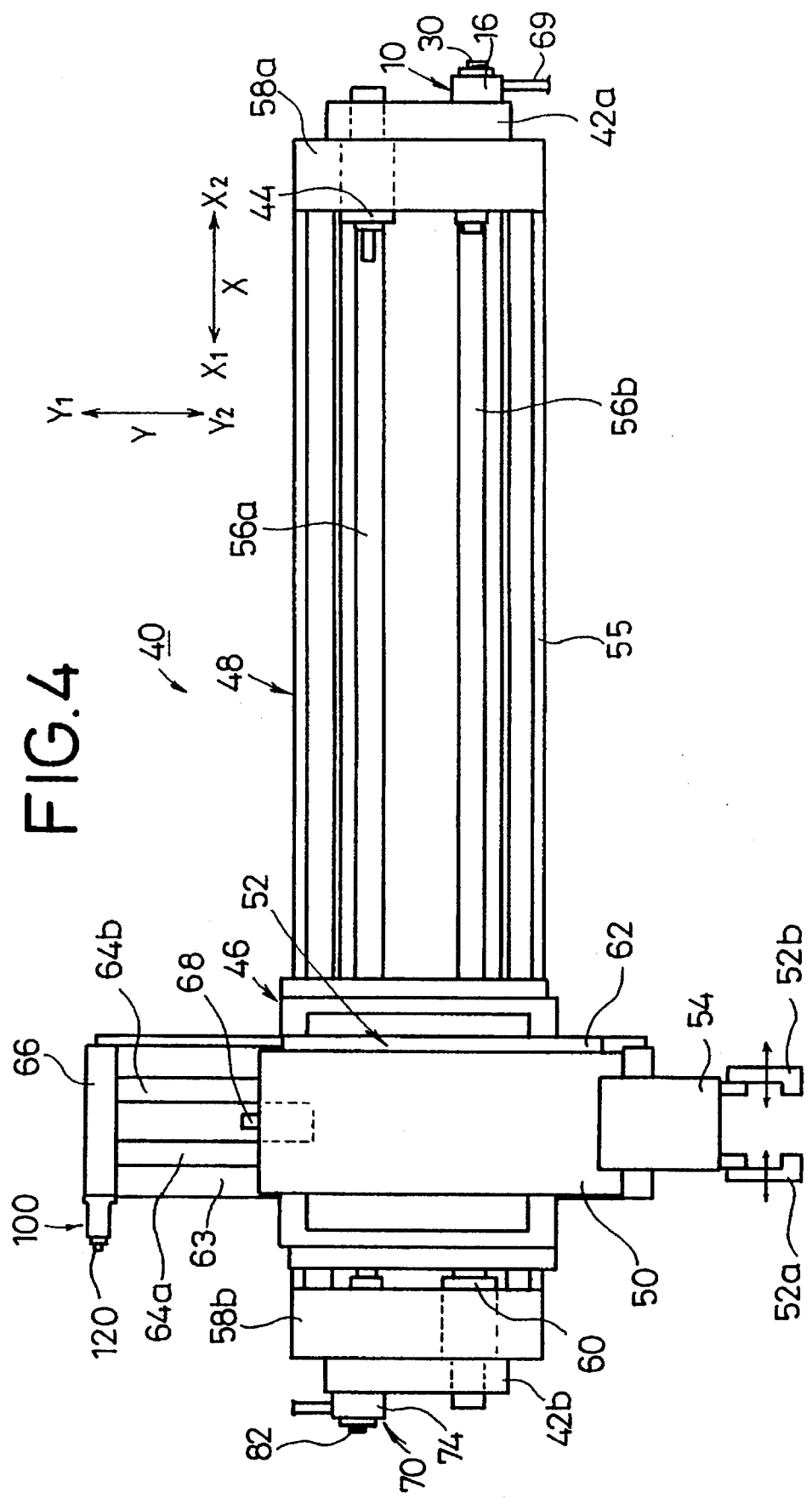
FIG. 4 is a plan view showing a workpiece feed apparatus on which a shock load sensor, which may be the shock load sensor shown in FIG. 1, 2, or 3, is mounted.

As shown in FIG. 4, a machine or an apparatus, such as a workpiece feed apparatus 40, has a shock absorber 44 for absorbing shocks or impacts applied by a slide table 46 that is movable along an X-axis which is the same as the X-axis shown in FIG. 1. The shock load sensor 10 is installed on an end plate 42a of the workpiece feed apparatus 40 by an attaching means such as an adhesive, screws, or the like. Specifically, in order for the shock load sensor 10 to be able to detect a load F (including a dynamic energy applied to an object) in the direction indicated by the arrow $X_2$ along the X-axis, the attachment surface 18 lies along a Y-axis that extends perpendicularly to the X-axis.

The workpiece feed apparatus 40 will be described in detail below. As shown in FIG. 4, the workpiece feed apparatus 40 basically comprises a first actuator 48 for moving the slide table 46 along the X-axis, and a second actuator 52 for moving a slide table 50 along the Y-axis normal to the X-axis. The second actuator 52 is mounted on an upper surface of the slide table 46 through a fixing plate 63. A chuck 54 having a pair of hands 52a, 52b movable in the directions indicated by the arrows for gripping a workpiece (not shown) is mounted on an end of the slide table 50. The first and second actuators 48, 52 may comprise either fluid cylinders for moving the slide tables 46, 50 in response to the supply of a fluid under pressure from ports thereto, or electric motors for moving the slide tables 46, 50 in response to the supply of an electric current from a power supply thereto.

The first actuator 48 has a long base 55, the slide table 46 mounted on the base 55 for displacement in the longitudinal direction of the long base 55 along the X-axis, a pair of parallel rods 56a, 56b mounted on and extending longitudinally along the base 55 for guiding the slide table 46 along the X-axis, and a pair of stopper blocks 58a, 58b mounted on respective opposite ends of the base 55 and coupled to opposite ends of the rods 56a, 56b for engaging the slide table 46 to limit a range of displacement of the slide table 46. The shock absorber 44 is mounted in the stopper block 58a for absorbing shocks produced when the slide table 46 hits the stopper block 58a. The end plate 42a is attached to an outer surface of the stopper block 58a.

The second actuator 48 has a long base 62, the slide table 50 mounted on the base 62 for displacement in the longitudinal direction of the long base 62 along the Y-axis, a pair of parallel rods 64a, 64b mounted on and extending longitudinally along the base 62 for guiding the slide table 50 along the Y-axis, and a stopper plate 66 mounted on an end of the base 62 and coupled to ends of the rods 64a, 64b for engaging the slide table 50 to limit displacement of the slide table 50 in the direction indicated by the arrow $Y_1$. A shock absorber 68 is mounted on an end of the slide table 50 for absorbing a load produced in the direction $Y_1$ when the slide table 50 hits the stopper plate 66.

After the shock load sensor 10 has been installed on the workpiece feed apparatus 40, the adjustment screw 30 is turned with a screwdriver bit to adjust the resiliency of the spring 26 which urges the movable member 28. When the resiliency of the spring 26 is thus adjusted, it is possible to select the load F detected by the shock load sensor 10 from a wide range of load values. The resiliency of the spring 26 may be adjusted before shock load sensor 10 is installed on the workpiece feed apparatus 40. Then, a power supply (not shown) is connected between the terminals 22, 24 and turned on.

While the shock absorbing capability of the shock absorber 44 is functioning normally, the preset resiliency of the spring 26 is greater than the load F that is applied in the direction $X_2$ when the slide table 46 hits the stopper block 58a. Therefore, the movable member 28 remains seated on and hence held in contact with the attachment 20 under the resiliency of the spring 26. Therefore, the movable member 28, which is made of an electrically conductive material, is electrically connected to the metal strips 34a, 34b, and hence the terminals 22, 24 are electrically connected to each other through the movable member 28.

If the shock absorbing capability of the shock absorber 44 is lowered and it malfunctions, the shock absorber 44 fails to sufficiently absorb shocks produced when the slide table 46 hits the stopper block 58a. Therefore, when the slide table 46 hits the stopper block 58a, the load F that is applied to the attachment surface 18 in the direction $X_2$ becomes excessive enough to overcome the preset resiliency of the spring 26. Upon hitting engagement of the slide table 46 with the stopper block 58a, the movable member 28 is forced off the attachment 20 in the direction $X_2$, electrically disconnecting the terminals 22, 24 from each other. Now, the shock load sensor 10 applies a signal through a lead wire 69 to a controller (not shown). The controller detects the signal, and stops the operation of the workpiece feed apparatus 40 and sends a signal to an alarm unit or light-emitting element to indicate the failure of the shock absorber 44 to the operator.

Alternatively, the controller may count signals from the shock load sensor 10, and output a signal to shut off the workpiece feed apparatus 40 when a predetermined count is reached.

Figure 2:
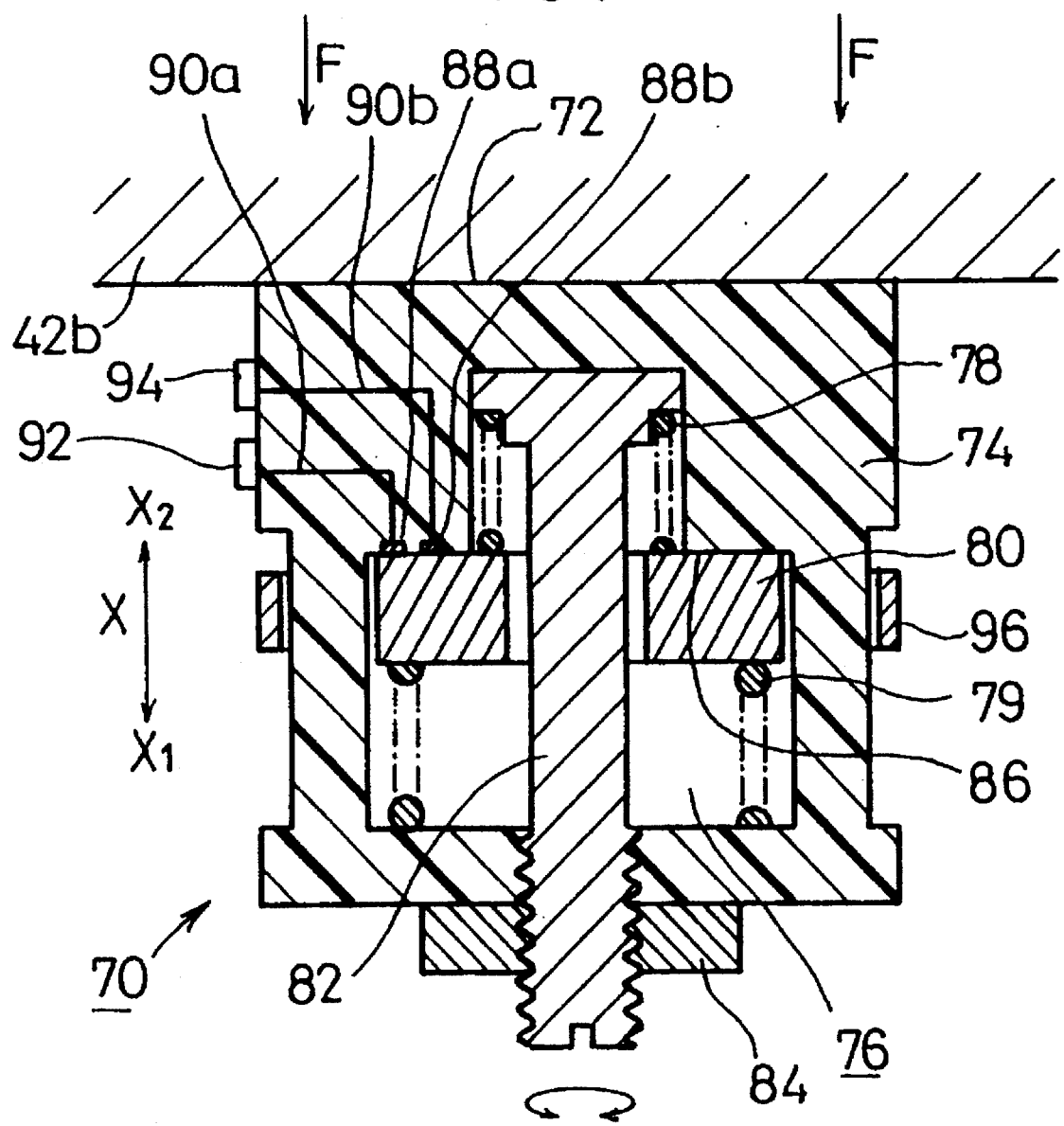
FIG. 2 is a vertical cross-sectional view of a shock load sensor according to a second embodiment of the present invention.

FIG. 2 shows a shock load sensor 70 according to a second embodiment of the present invention.

The shock load sensor 70 includes a sensor body 74 having an attachment surface 72 on one side thereof, first and second springs 78, 79 disposed in a chamber 76 defined in the sensor body 74, an annular movable member 80 having a predetermined weight and interposed between the first and second springs 78, 79, an adjustment screw 82 having a head disposed as a spring seat in the chamber 76 and held in engagement with the second spring 79 for adjusting the resilient forces of the first and second springs 78, 79 upon rotation of the adjustment screw 82, and a lock nut 84 threaded over the adjustment screw 82 outside of the sensor body 74 for holding the adjustment screw 82 in a rotated position thereof.

The chamber 76 has an annular step wall 86 positioned between the first and second springs 78, 79, and the annular movable member 80 is normally seated on the annular step wall 86 under the resiliency of the first and second springs 78, 79. A pair of spaced metal strips 88a, 88b is mounted on the annular step wall 86 and is normally held in contact with the annular movable member 80. The metal strips 88a, 88b are connected through respective lead wires 90a, 90b to a pair of terminals 92, 94 mounted on an outer side of the sensor body 74. An annular member 96 is disposed around the sensor body 74 closely to the movable member 80 for displacement in unison with the movable member 80. The movable member 80 is made of an electrically conductive material such as metal, and either one or both of the annular member 96 and the movable member 80 are made of a magnetic material.

Operation of the shock load sensor 70 according to the second embodiment will be described below. The shock load sensor 70 is incorporated in the workpiece feed apparatus 40 shown in FIG. 4, and the structure and operation of the workpiece feed apparatus 40 are the same as described above and will not be described in detail below.

The shock load sensor 70 is mounted on an end plate 42b that is attached to the stopper block 58b in which a shock absorber 60 is mounted. The attachment surface 72 lies along the Y-axis that extends perpendicularly to the X-axis.

Then, the adjustment screw 82 is turned with a screwdriver bit to adjust the resiliency of the first and second springs 78, 79 which urge the movable member 80 and hold the movable member 80 seated on the stepped wall 86. Then, a power supply (not shown) is connected between the terminals 92, 94 and turned on.

While the shock absorbing capability of the shock absorber 60 is functioning normally, the movable member 80 supported by the first and second springs 78, 79 are seated on the stepped wall 86, and held in electric contact with the metal strips 88a, 88b. The terminals 92, 94 are electrically connected to each other through the movable member 80.

If the shock absorbing capability of the shock absorber 60 is lowered and it malfunctions, the shock absorber 60 fails to sufficiently absorb shocks produced when the slide table 46 hits the stopper block 58b. Therefore, when the slide table 46 hits the stopper block 58b, the load F that is applied to the attachment surface 72 in the direction $X_1$ becomes excessive enough to overcome the preset resiliency of the second spring 79. Upon hitting engagement of the slide table 46 with the stopper block 58b, the movable member 80 is forced off the stepped wall 86 in the direction $X_1$, electrically disconnecting the terminals 92, 94 from each other. Now, the shock load sensor 70 applies a signal to the controller. The controller detects the signal, and stops the operation of the workpiece feed apparatus 40 and sends a signal to the alarm unit or light-emitting element to indicate the failure of the shock absorber 60 to the operator.

When the movable member 80 is displaced, the annular member 96 is also displaced in unison with the movable member 80 under magnetic forces. Such a displacement of the annular member 96 gives the operator a visual indication of the malfunctioning of the shock absorber 60. When the controller is supplied with a signal from the shock load sensor 70 in the event that the annular member 96 is not displaced, the operator can recognize some sensor trouble due, for example, to a disconnection of the lead wires 90a, 90b or a contact failure between the movable member 80 and the metal strips 88a, 88b.

Figure 3:
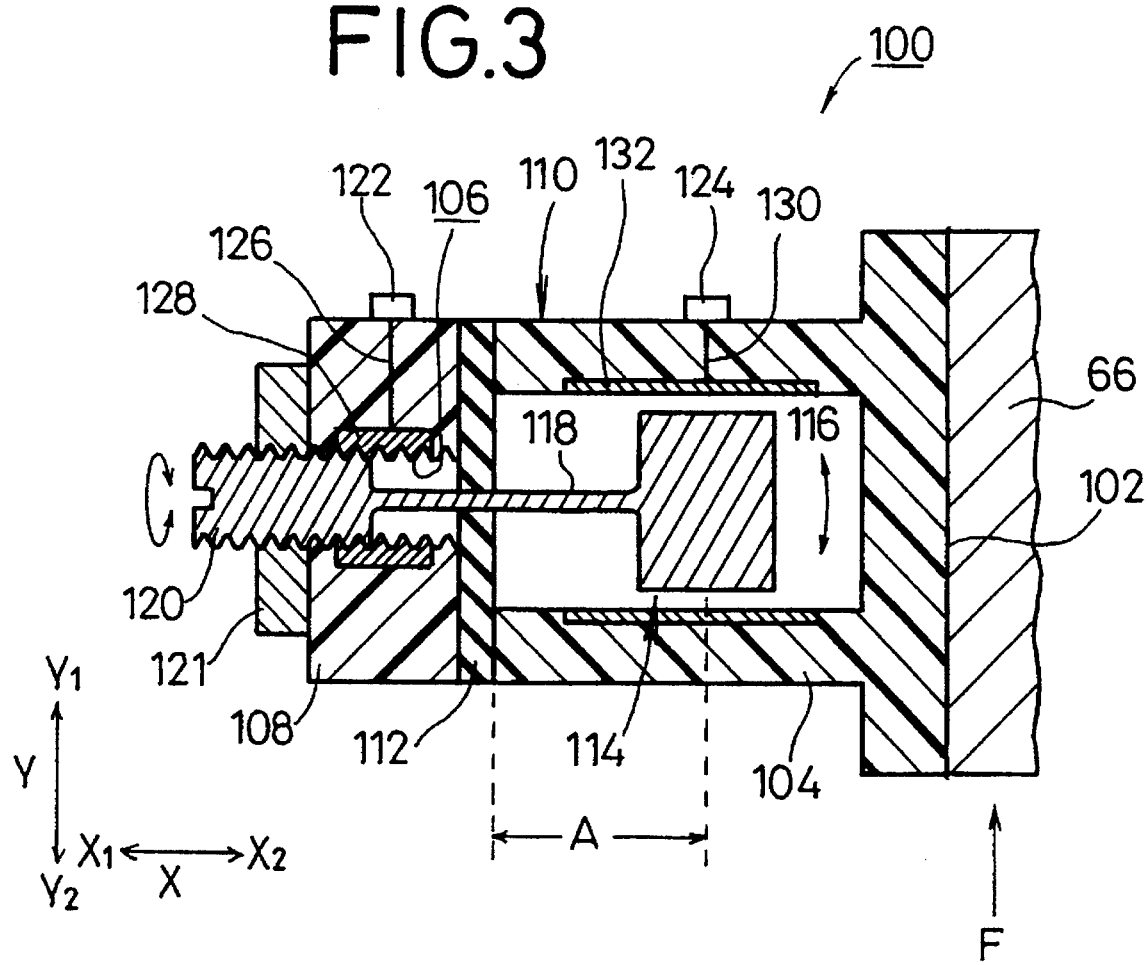
FIG. 3 is a vertical cross-sectional view of a shock load sensor according to a third embodiment of the present invention.

FIG. 3 shows a shock load sensor 100 according to a third embodiment of the present invention.

The shock load sensor 100 comprises a sensor body 110 made of an insulating material and including a first block 104 having an attachment surface 102 and a second block 108 having a threaded hole 106, and a movable member 114 having a predetermined weight and supported by a guide plate 112 interposed between the first and second blocks 104, 108. The first and second blocks 104, 108 may be made of an electrically conductive material, and the guide plate 112 may be made of an electrically insulating material.

The movable member 114 comprises a swing body 116 swingable in the directions indicated by the arrows, a support arm 118 extending from the swing body 116 and supported by the guide plate 112, and a screw 120 joined to the support arm 118 and threaded in a threaded hole 106 defined in the second block 108. The movable member 114 is made of an electrically conductive material such as spring steel, and at least the support arm 118 is made of a flexible material. The screw 120 is kept in position by a lock nut 121 held against the second block 108. The length A of the swing body 116 and the support arm 118 which is supported by the guide plate 112 can be adjusted when the screw 120 is turned about its own axis.

A pair of spaced terminals 122, 124 is mounted on an outer side surface of the sensor body 110. Specifically, the terminal 122 is disposed on an outer side surface of the second block 108 and electrically connected through a lead wire 126 to a metal ring 128 disposed in the second block 108 around the threaded hole 106. The terminal 124 is disposed on an outer side surface of the first block 104 and electrically connected through a lead wire 130 to a metal ring 132 disposed on an inner wall surface of the first block 104.

The shock load sensor 100 according to the third embodiment operates as follows:

The shock load sensor 100 is incorporated in the workpiece feed apparatus 40 shown in FIG. 4, and the structure and operation of the workpiece feed apparatus 40 are the same as described above and will not be described in detail below. The shock load sensor 100 is mounted on the stopper plate 66 which is engageable with the slide table 50. The attachment surface 102 lies substantially parallel to the Y-axis along which the slide table 50 is displaceable, so that the shock load sensor 100 is capable of detecting a load F applied when the shock load sensor 100 is displaced in the direction $Y_1$ into hitting engagement with the stopper plate 66.

The screw 120 is turned with a screwdriver bit to adjust the length A to a suitable value. A power supply (not shown) is connected between the terminals 122, 124 and turned on.

While the shock absorbing capability of the shock absorber 68 is functioning normally, shocks are effectively dampened by the shock absorber 68 and the swing body 116 supported by the guide plate 112 through the support arm 118 is held out of contact with the ring 132. At this time, the terminals 122, 124 are electrically disconnected to each other.

If the shock absorbing capability of the shock absorber 68 is lowered and it malfunctions, the shock absorber 68 fails to sufficiently absorb shocks produced when the slide table 50 hits the stopper block 66 upon movement in the direction $Y_1$ along the rods 64a, 64b. Therefore, when the slide table 50 hits the stopper block 66, the load F that is applied to the attachment surface 101 parallel thereto in the direction $Y_1$ becomes excessive. Upon hitting engagement of the slide table 50 with the stopper block 66, the swing body 116 swings in the directions indicated by the arrows, i.e., the arrows $Y_1$, $Y_2$, about the portion of the support arm 118 which is supported by the guide plate 112. The swing body 116 is now brought into contact with the ring 132, thus electrically connecting the terminals 122, 124 to each other. Now, the shock load sensor 100 applies a signal to the controller. The controller detects the signal, determines that the shock absorbing capability of the shock absorber 68 is lowered or it malfunctions, and sends a signal to shut off the workpiece feed apparatus 40.

Although certain preferred embodiments of the present invention has been shown and described in detail, it should be understood that various changes and modifications may be made therein without departing from the scope of the appended claims.

What is claimed is:

1. A shock load sensor comprising:

a casing having an attachment surface adapted to be mounted on an apparatus;

a pair of terminals mounted on said casing;

a spring disposed in said casing;

a movable member having a predetermined weight, which is made of an electrically conductive material and disposed in said casing for displacement in response to a shock load applied in excess of a predetermined level to bring said terminals into or out of electric connection with each other for thereby producing a signal;

said movable member being supported by said spring such that an expansive restorative force of said spring urges said movable member against said terminals, said movable member being displaceable against the resiliency of said spring to bring said terminals into or out of electric connection with each other for thereby producing said signal.

2. A shock load sensor according to claim 1, wherein said shock load sensor is used to detect, based on said signal, whether the shock absorbing capability of a shock absorber mounted on said apparatus is functioning normally.

3. A shock load sensor according to any one of claims 1 or 2, further comprising load setting means for adjusting a force to hold said movable member in contact with said terminals under the resiliency of a spring, said load setting means comprising an adjustment screw supported on said casing.

4. A shock load sensor according to claim 1 or 2, further comprising load setting means for adjusting the position of an integral distal end portion of said movable member.

5. A shock load sensor according to claim 1, wherein said attachment surface lies substantially perpendicularly or parallel to the direction in which said shock load is applied.

6. A shock load sensor comprising:

a casing having an attachment surface adapted to be mounted on an apparatus;

a pair of terminals mounted on said casing;

a spring disposed in said casing;

a movable member having a predetermined weight, which is made of an electrically conductive material and disposed in said casing for displacement in response to a shock load applied in excess of a predetermined level to bring said terminals into or out of electric connection with each other for thereby producing a signal;

said movable member being supported by said spring such that an expansive restorative force of said spring urges said movable member against said terminals, said movable member being displaceable against the resiliency of said spring to bring said terminals into or out of electric connection with each other for thereby producing said signal; and further comprising a displacement member disposed outside of said casing for displacement in unison with said movable member, at least one of said displacement member and said movable member being made of a magnetic material.

7. A shock load sensor according to claim 1, wherein said casing is made of an electrically insulating material.

8. A shock load sensor according to claim 7, wherein said casing has a space defined therein, said movable member being housed in said space, said terminals being exposed in said space, whereby said movable member can be brought into contact with said terminals.

9. A shock load sensor comprising:

a casing having an attachment surface adapted to be mounted on an apparatus;

a pair of terminals mounted in said casing;

a movable member having a predetermined weight, which is made of an electrically conductive material and disposed in said casing for displacement in response to a shock load applied in excess of a predetermined level;

said movable member comprising a swingable body maintained in constant contact with one of said pair of terminals, said movable member swinging in response to said shock load to cause said movable member to contact the other of said terminals, thereby bring said terminals into or out of electric connection with each other for thereby producing a signal.

10. A shock load sensor comprising:

a casing having an attachment surface adapted to be mounted on an apparatus;

a pair of terminals mounted on said casing;

said casing having a space defined therein; and a movable member having a predetermined weight housed in said space, which is made of an electrically conductive material and disposed in said casing for displacement in response to a shock load applied in excess of a predetermined level to bring said terminals into or out of electric connection with each other for thereby producing a signal, wherein said terminals are exposed in said space and provided in parallel side-by-side relation to each other on one wall surface of said casing and in opposing relation to a connecting surface of said movable member, wherein said movable member is movable into and out of contact with said pair of terminals.

11. A shock load sensor according to claim 9, wherein said shock load sensor is used to detect, based on said signal, whether the shock absorbing capability of a shock absorber mounted on said apparatus is functioning normally.

12. A shock load sensor according to claim 10 or 11, further comprising a spring disposed in said casing, said movable member being supported by said spring for displacement against the resiliency of said spring to bring said terminals into or out of electric connection with each other for thereby producing said signal.

13. A shock load sensor according to claim 10 further comprising load setting means for adjusting a force to hold said movable member in contact with said terminals under the resiliency of a spring, said load setting means comprising an adjustment screw supported on said casing.

14. A shock load sensor according to claim 10 or 11, further comprising load setting means for adjusting the position of an integral distal end portion of said movable member.

15. A shock load sensor comprising:

a casing having an attachment surface adapted to be mounted on an apparatus;

a pair of terminals mounted on said casing; and a movable member having a predetermined weight, which is made of an electrically conductive material and disposed in said casing for displacement in response to a shock load applied in excess of a predetermined level to bring said terminals into or out of electric connection with each other for thereby producing a signal, wherein said terminals are provided in parallel relation to each other and to a connecting surface of said movable member; and further comprising a displacement member disposed outside of said casing for displacement in unison with said movable member, at least one of said displacement member and said movable member being made of a magnetic material.

16. A shock load sensor according to claim 10, wherein said casing is made of an electrically insulating material.

17. A shock load sensor according to claim 11 further comprising load setting means for adjusting a force to hold said movable member in contact with said terminals under the resiliency of a spring, said load setting means comprising an adjustment screw supported on said casing.

18. A shock load sensor according to claim 12 further comprising load setting means for adjusting a force to hold said movable member in contact with said terminals under the resiliency of a spring, said load setting means comprising an adjustment screw supported on said casing.

* * * * *